(12) United States Patent
Rai et al.

(10) Patent No.: US 7,242,302 B2
(45) Date of Patent: Jul. 10, 2007

(54) SYSTEMS AND METHODS FOR CAPTURING WORKFLOW INFORMATION

(75) Inventors: Sudhendu Rai, Fairport, NY (US); James L. Mayer, Rochester, NY (US)

(73) Assignee: Xerox Corporation, Stamford, CT (US)

( * ) Notice: Subject to any disclaimer, the term of this patent is extended or adjusted under 35 U.S.C. 154(b) by 203 days.

(21) Appl. No.: 11/094,405

(22) Filed: Mar. 31, 2005

(65) Prior Publication Data

US 2006/0226980 A1  Oct. 12, 2006

(51) Int. Cl.
*G08B 13/14* (2006.01)
(52) U.S. Cl. ............... 340/572.1; 235/376; 235/385
(58) Field of Classification Search ............ 340/572.1, 340/539.13, 825.49, 5.92; 235/375, 376, 235/385; 705/28; 700/226
See application file for complete search history.

(56) References Cited

U.S. PATENT DOCUMENTS

| | | | | |
|---|---|---|---|---|
| 6,401,078 B1* | 6/2002 | Roberts et al. | ............... | 705/28 |
| 6,739,512 B2* | 5/2004 | Guerrero et al. | ........ | 235/462.01 |
| 6,764,004 B2* | 7/2004 | White | ......................... | 235/385 |
| 6,860,422 B2* | 3/2005 | Hull et al. | ................... | 235/376 |
| 6,916,128 B1* | 7/2005 | Petteruti et al. | .............. | 400/88 |
| 6,954,148 B2* | 10/2005 | Pulkkinen et al. | ........ | 340/572.1 |
| 7,098,793 B2* | 8/2006 | Chung | ..................... | 340/572.1 |
| 7,117,374 B2* | 10/2006 | Hill et al. | ................... | 713/193 |
| 7,143,041 B2* | 11/2006 | Sacks et al. | ................. | 704/270 |

OTHER PUBLICATIONS

U.S. Appl. No. 11/094,231, filed Mar. 31, 2005, Rai.

* cited by examiner

*Primary Examiner*—John Tweel, Jr.
(74) *Attorney, Agent, or Firm*—Oliff & Berridge, PLC

(57) ABSTRACT

A system and method comprising RF tags, RFID readers, voice input devices, and voice recognition software may capture even characteristics associated with a workflow. Workflow characteristics, such as JobId, OperatorID, StationId and EventId may be stored in RF tags and may be captured along with a timestamp, when brought together in the close proximity of a RFID reader. Next node information may be captured to construct detailed workflow diagrams based upon captured data. Quantity information, as well as other information, may be entered verbally and converted to computer readable form using voice recognition software.

20 Claims, 4 Drawing Sheets

SYSTEMS AND METHODS FOR CAPTURING WORKFLOW INFORMATION

Cross-reference is made to co-pending, commonly assigned application, U.S. patent application Ser. No. 11/094,231, filed Mar. 31, 2005, by Sudhendu RAI, entitled "Systems and Methods to Determine Process Cycle Efficiency in Production Environments", the entire disclosure of which is herein incorporated by reference.

BACKGROUND

This invention relates to tracking systems and methods for tracking job data generated in document production environments. More specifically, the present invention relates to collecting workflow related information using wireless and voice detection technologies.

Most production environments utilize manual data collection methods for collecting workflow related information. This information may consist of job identification information, operator information, workstation information and quantity information.

Technological advances have introduced automation to the manual collection methods and include PC based collection devices as well as wireless handheld barcode scanners.

SUMMARY

Although there has been a significant improvement over manual methods, it is important to continue to improve this technology to make it more robust, accurate, and easy to use. Various exemplary embodiments provide systems and methods for capturing production workflow information that may include RFID tags, RFID readers, audio input devices and/or speech recognition technologies to gather production workflow data. Such RFID readers and audio input devices may be connected to a computer network to allow production jobs to be tracked without geographic limitations.

RFID tags containing unique job identifiers, or jobIDs, may be attached to job tracking documents associated with physical jobs in production workflows. Operators may be similarly tagged with wristbands containing RFID tags with unique operator IDs. Individual production workstations may be assigned unique workstation IDs and these workstation IDs may be stored in RFID tags collocated with the workstation.

A limited range RFID reader may be placed near each workstation in range of the workstation RFID tag. Colored RF tokens, representing unique events, may be provided to the operator of the production station. Job events may then be tracked using these RF tags. A record of the event may be recorded when all of the required RF tags are within reading range of the RF reader. Quantity data may be captured using voice input devices and may then be converted into digital data using speech recognition technology.

Such embodiments may reduce system costs, improve reliability, accuracy and/or improve productivity by providing faster access to production workstations. Further, such embodiments may make the collection process easier to use, for example, by eliminating the need for barcode scanners and manual entry devices.

It should be understood that the exemplary data collection systems and methods disclosed herein may be used in conjunction with other devices in other workplace environments, and that the exemplary embodiments described herein are not limiting.

BRIEF DESCRIPTION OF THE DRAWINGS

Various exemplary embodiments are described in detail, with reference to the following figures, wherein.

DETAILED DESCRIPTION OF EMBODIMENTS

The following detailed description of exemplary embodiments is particularly directed to systems and methods for capturing production workflow information. The exemplary embodiments described below are particularly directed to print shop environments. Thus, the following detailed description makes specific reference to workflows wherein the workstations include Xerographic devices such as printers. However, it should be understood that the principles and techniques described herein may be used in other environments such as mailrooms, document scanning centers and other services operations involving equipment that requires manual handling.

Figure 1:
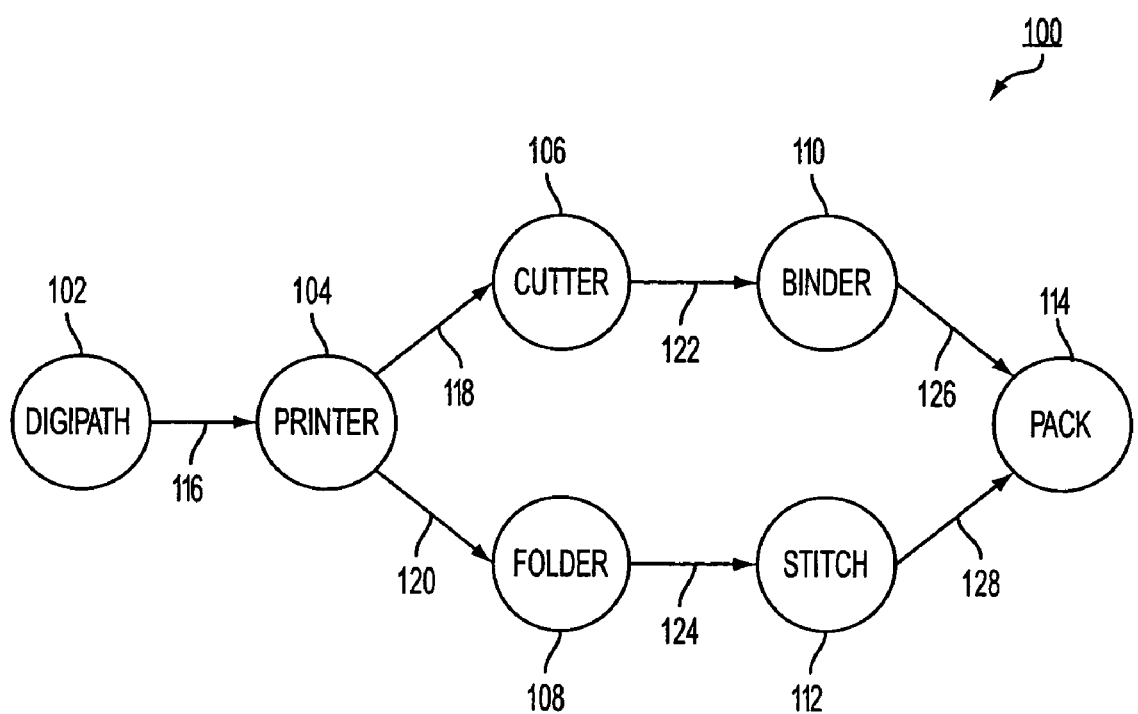
FIG. 1 illustrates an exemplary block diagram of a print production workflow.

As shown in the exemplary workflow schematic of FIG. 1, a workflow, determining the flow of the job from one workstation to another, may be represented as a directed graph illustrating workstations 102-114 and directed arcs 116-128. The exemplary systems and methods discussed below disclose how one may collect information regarding events happening at each workstation 102-114 in a workflow 100 as a print job progresses from one workstation to another.

In the exemplary workflow of FIG. 1, a print production workflow may comprise: creating the print job at a Digipath workstation 102; progressing to a printer workstation 104 via arc 116; and outputting some quantity of printer output to a cutter workstation 106 via arc 118. The output of the cutter workstation 106 may be directed, via arc 122, to a binder workstation 110, the output of which is directed via arc 126 to a packing workstation 114. In parallel with the cutting, binding and packing of some of the print job output, a portion of the output from printer workstation 104 may be directed via arc 120 to folder workstation 108. The folded output may then be directed via arc 124 to a stitching workstation 112 after which the stitched output may be direct via arc 128 to the packing workstation 114.

At each workstation 102-114, certain types or quantities of workflow information may be of interest and may be collected. A set of information types collected regarding the production at each workstation may include but is not limited to: JobId: A unique identifier that captures the information on the job itself. StationID: A unique identifier that identifies the workstation performing the task. OperatorID: A unique identifier that identifies the operator working on the particular job at the particular station. EventId: One of a set of event types that includes identification of the event (e.g. Start, Stop, Interrupt, Restart, etc.) Quantity: The quantity of work product to be produced at the particular StationID by the particular OperatorID for that particular JobId.

Figure 2:
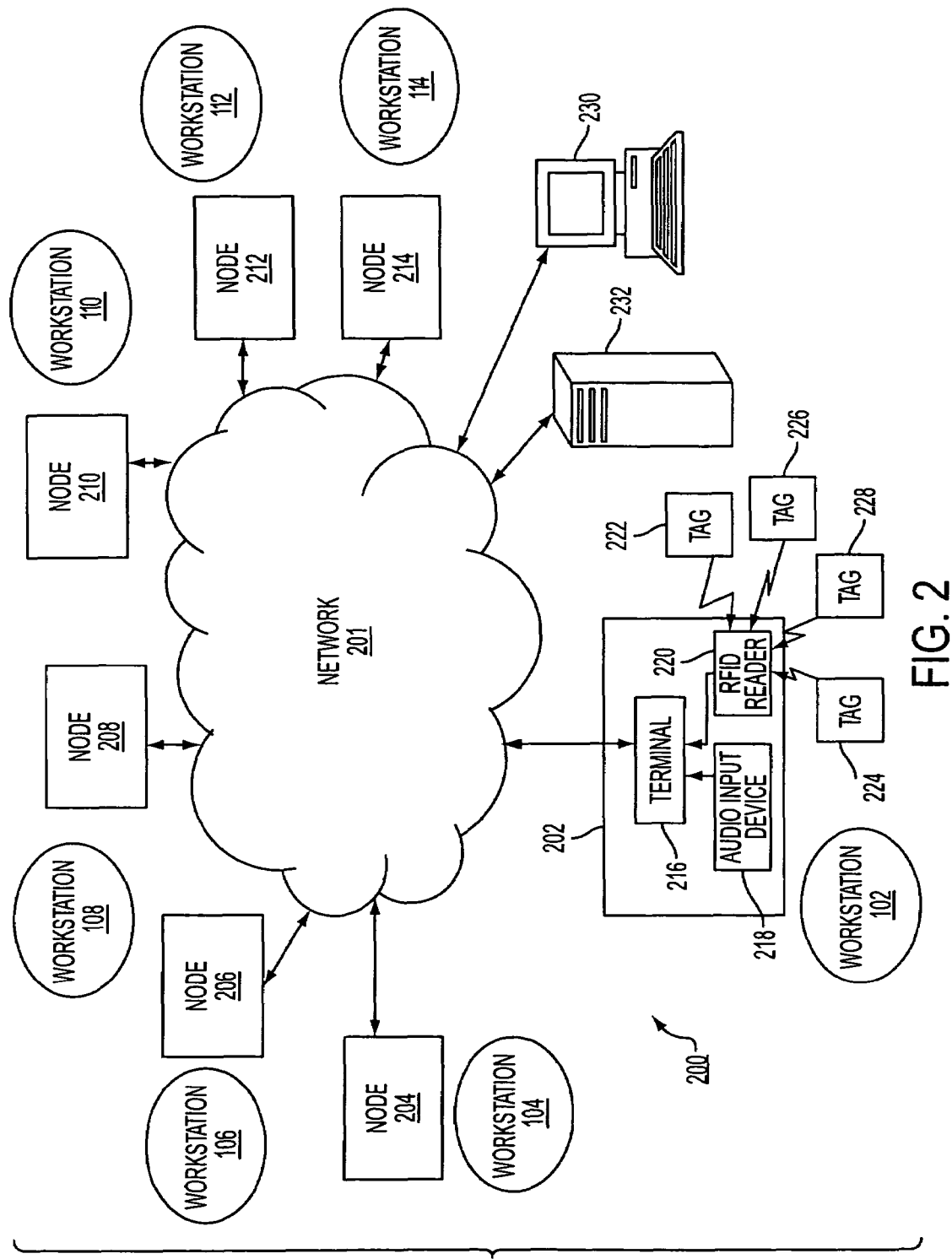
FIG. 2 is an exemplary block diagram of a system by which workflow information from multiple workstations spaced across a network may be captured.

FIG. 2 illustrates a high-level block diagram of a system 200 for capturing production workflow information across a network 201 providing a plurality of workstations 102-114 as identified in FIG. 1. RFID technology, incorporating RF tags and RFID readers may be used to capture the workflow information. Tracking node 202-214 may be located in close proximity to respective workstation 102-114 and may include a communications device 216, a RFID reader 220 and a voice input device 218.

Tracking data for each of workstations 102-114 may be captured and transmitted to the appropriate destination through devices 202-214. The communications device 216 may include a computer or other hardware device in electrical communication with the network 201, and may transmit the data captured by the RF reader 220 and the voice input device 218 to the computer network 201. Although the exemplary block diagram of FIG. 2 illustrates the functions of the communications device 216, the RF reader 220 and the voice input device 218 as distinct blocks, the physical location of the components performing the function is non-limiting and may be located in a single device or a plurality of discrete components.

FIG. 2 illustrates an exemplary block diagram of a system 100 for capturing workflow information that may comprise workstations 102-114 and respective tracking nodes 202-214 in communication with network 201. A representative node 202 has been shown in greater detail and is discussed in detail below.

The JobId information may be encoded on a JobId tag 222 that may be attached to paperwork associated, and traveling with, a particular print job. A workstation operator may wear an OperatorId tag 224, such as a wristband or ID badge with an RF tag disposed thereon. Similarly, each of workstations 102-114 may have a unique StationId tag 226 mounted in close proximity to its respective workstation 102. EventId tags 228 may be attached to tokens available to the operator and may be colored and marked for ease of use.

The voice input device 218 may accept verbally spoken data after the RF tags 222-228 are read. In one exemplary embodiment, the verbally entered data may be quantity data pertaining to the output of a particular workstation, such as, for example, the number of pages. The verbally entered data, however, is not limited to any particular type of information. Speech recognition software converts the verbally entered information to electronically storable data, and may be collocated with the voice input device, located in the device 216, on the network 201, or in any convenient location.

Figure 3:
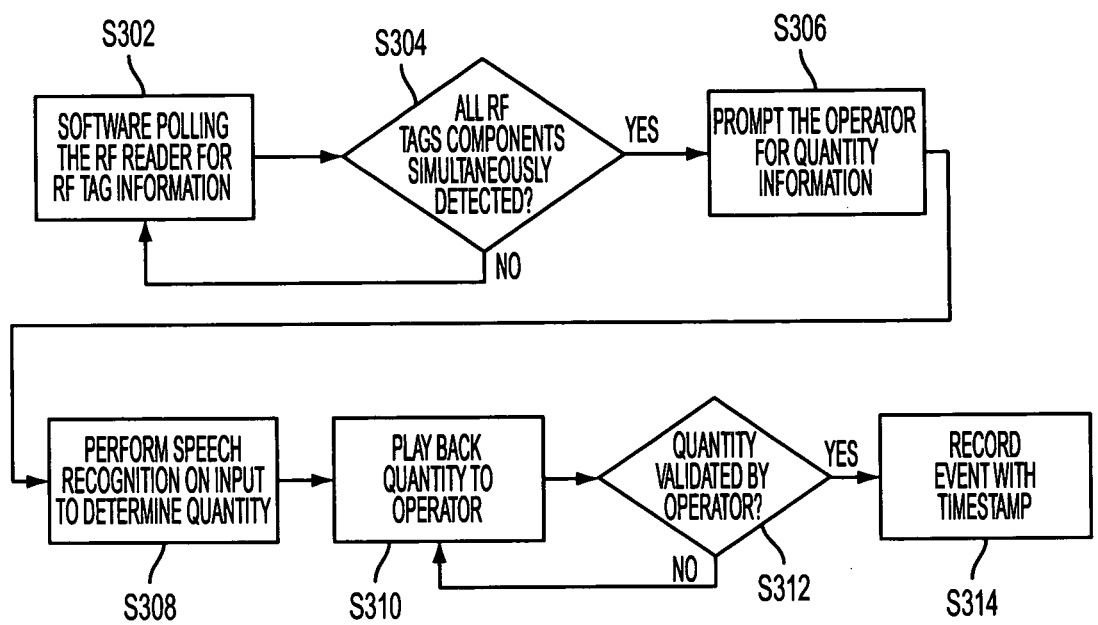
FIG. 3 is an exemplary flow chart for recording events at a workstation using RFID and speech recognition technologies according the collection system of FIG. 1.

FIG. 3 illustrates an exemplary flowchart capturing workflow information for workstation 102 and node 202, using RFID and speech recognition technologies. At step S302, software, either local to the node 202 or distributed on the network 201, may continuously poll the RF reader 220 for the proximate presence of RF tags. As discussed above, the StationId tag may be mounted to the workstation in close proximity to the node 202. Collocating the workstation 102, the StationId tag 224 and the RF reader 220 may allow an operator to enter workflow information by simply performing the required workstation operation while being within scanning range of the RF reader 220. Such an exemplary embodiment may make the task of data entry easy and non-obtrusive.

At step S304, the system 100 may require all RF tags 222-228 associated with an event to be scanned by the RF reader 220 within a predetermined time, once a first tag has been detected.

After all RF tag information has been scanned, the operator may be prompted to enter verbal information at step S306. The node 202 may prompt the operator by a visual indication, an audible indication or other alerting mechanism by which the operator is prompted to enter data. In an exemplary embodiment, the operator may be prompted to verbally enter quantity information. At step S308, speech recognition software may convert the audio response to computer readable data.

Accuracy of input data may be of critical importance. To minimize the possibility of error, the output of the speech recognition software may be converted back to audio at step S310 to allow the operator to validate the quantity at step S312. Validation may include a simple verbal reply, in which case the data is accepted, or a negative affirmation in which case the operator may be prompted to reenter the quantity. Once the verbal information is accepted, a timestamp, associated with the data entered, may be stored at step S314. The timestamp may contain the date and time that a new event started to collect data, or may record the time when all the data has been collected by the reader 220, sent to the network 201, or alternatively, read by the network 201. Alternatively, the timestamp information may be generated by the network 201 and not be a data element required to be sent by the node 202-214.

In one embodiment, the collected data for a node may be transmitted to the network in real time as the data is collected. In an alternate embodiment, the information from all the tags and the voice input may be collected at the node 202 and transmitted to the network, along with the timestamp, in one transmission.

Figure 4:
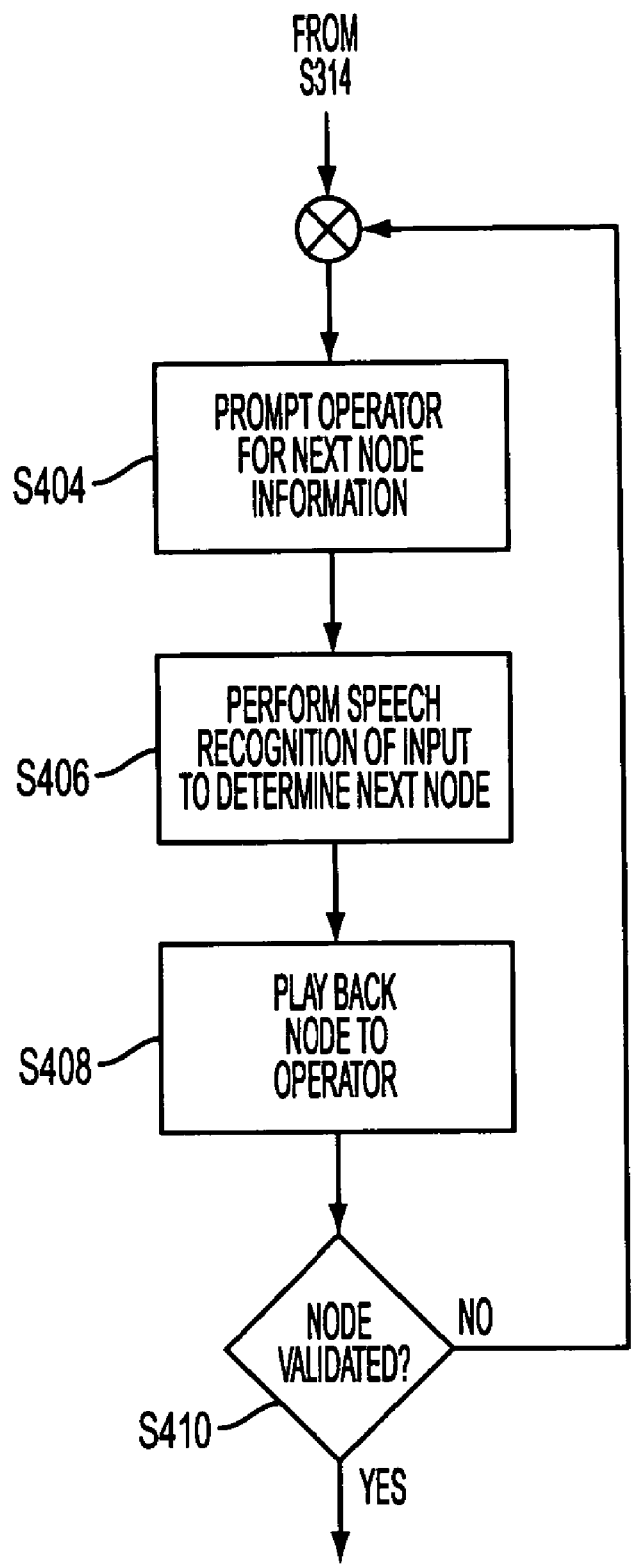
FIG. 4 is an exemplary flow chart according the flowchart of FIG. 3 including the collection of data identifying the next station.

As shown in the exemplary flowchart in FIG. 4, recording a next subsequent node in the workflow may further enhance the functionality of the tracking system 100. Upon completion of step S314, the operator may be prompted at step S404 for information regarding the next node in the workflow process 100. The prompt may be verbal, visual or in any form that will elicit a response. The response identifying the next node may be verbal, in which case speech recognition is performed at step S406 to convert the verbal response to computer storable data. An audio signal may then be regenerated from the converted data and presented to the operator at step S408 for verification S410. If the entered data is not validated, the operator may be prompted to renter the next node information at step S404. In another exemplary embodiment, the previous node may be recorded at the current workstation to provide positive linkage between nodes.

Upon completion of data capture at a particular node, the process may be repeated at subsequent nodes in the workflow. Based upon the next node information collected in FIG. 4, detailed workflow diagrams may be unambiguously and automatically generated from the event data logs.

It will be appreciated that various of the above-disclosed and other features and functions, or alternatives thereof, may be desirably combined into many other different system or applications. Also, various presently unforeseen or unanticipated alternatives, modifications, variations or improvements therein may be subsequently made by those skilled in the art and are also intended to be encompassed by the following claims.

What is claimed is:

1. A system for capturing workflow information, comprising:
    a plurality of RF tags with workflow information stored therein, wherein the workflow information includes at least one information type; and
    at least one node configured to communicate with a computer network, the at least one node further comprising an RFID reader and an audio input device, the audio input device configured to receive verbally entered workflow information;

wherein the at least one node is configured to transmit workflow information to the computer network based at least in part on input received by the RFID reader and the audio input device.

2. The system of claim 1, wherein the at least one information type includes at least one of a JobId information type, an OperatorId information type, a StationId information type and an EventId information type.

3. The system of claim 1, wherein each of the plurality of RF tags includes a single information type.

4. The system of claim 1, further comprising a computer network.

5. The system of claim 4, wherein the computer network includes a database containing the workflow information transmitted from the at least one node.

6. The system of claim 5, wherein the database contains a timestamp associated with collected workflow information.

7. The system of claim 5, wherein the database contains information regarding at least one of a previous node and a next node in the workflow.

8. The system of claim 1, wherein the at least one node converts verbally entered information to an electronically readable format.

9. The system of claim 1, wherein verbally entered data comprises quantity information.

10. The system of claim 1, wherein RF tags comprising a set of information types is read within a predetermined interval of time.

11. The system of claim 1, further comprising at least one workstation for which workflow information is to be captured.

12. The system of claim 11, wherein the at least one workstation comprises a Xerographic device.

13. A method of tracking workflow in a production environment including at least one workstation, comprising:
    providing a computer network;
    providing at least one tracking node in communication with the computer network, each node associated with at least one workstation, each node including a RFID reader and an audio entry device at each node;
    transmitting workstation related job information read by the RF reader from at least one tag to the computer network;
    prompting an operator to verbally enter information; and
    converting verbally entered information to computer readable data.

14. The method of claim 13, further comprising reading a predetermined number of tags from each type within a predetermined period of time.

15. The method of claim 13, further comprising transmitting information regarding at least one of a previous node and a next node in the workflow to the computer network.

16. The method of claim 15, wherein the information regarding the at least one of the previous node and the next node is verbally received.

17. The method of claim 13, further comprising storing a timestamp related to when job information is transmitted.

18. The method of claim 13, further comprising reading a set of tags, each tag containing at least one type of information.

19. The method of claim 18, wherein the at least one type of information is related to at least one of JobId information, OperatorId information, StationId information and EventId information.

20. A system for capturing workflow information, comprising:
    a plurality of RF tags having workflow information stored therein, each of the tags associated with one of a plurality of information types; and
    at least one node, each node further comprising a RFID reader configured to capture workflow information from at least one RF tag, and an audio input device, the audio input device configured to receive verbally entered workflow information.

* * * * *